Aug. 14, 1956   J. D. RUSSELL   2,758,550
VEHICLES WITH TRACK-LAYING TREADS AND WHEEL SUPPORTS
Filed Sept. 27, 1952
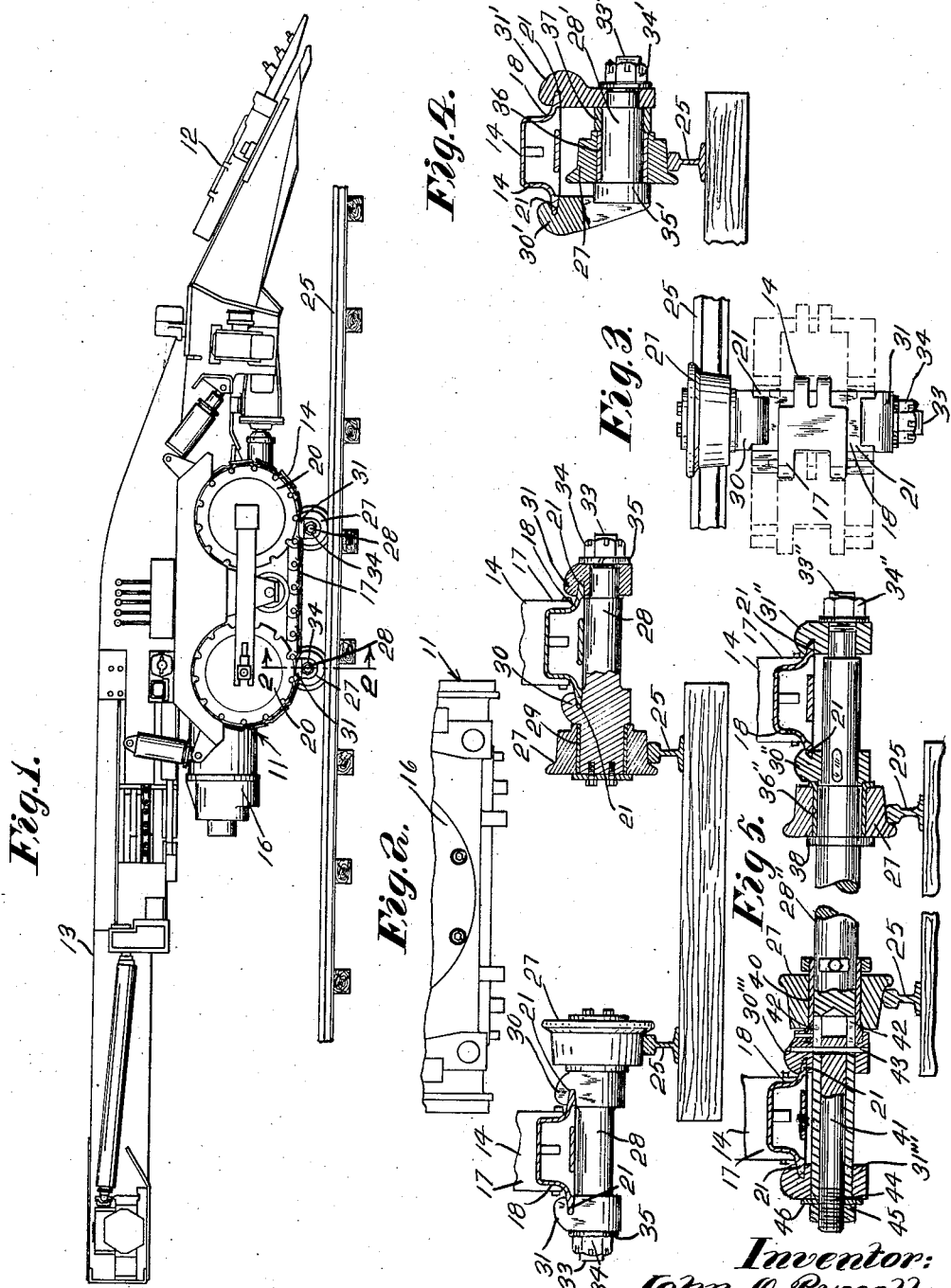
Inventor:
John D. Russell.
by
Lewis A. Minxom.
Attorney.

United States Patent Office 2,758,550
Patented Aug. 14, 1956

2,758,550

VEHICLES WITH TRACK-LAYING TREADS AND WHEEL SUPPORTS

John D. Russell, Franklin, Pa., assignor to Joy Manufacturing Company, Pittsburgh, Pa., a corporation of Pennsylvania Application September 27, 1952, Serial No. 311,890

18 Claims. (Cl. 105—215)

This invention relates to vehicles having endless, orbitally movable, track-laying treads, and particularly to such vehicles which have occasion not only to move on their treads over a subjacent surface but to be transported relatively rapidly over substantial distances in paths where the presence of track rails renders the movement of the vehicle directly by means of its track-laying treads relatively unsatisfactory.

Frequently in underground mining operations, for instance, it is desirable to have apparatus such as a loading machine equipped with endless track-laying treads or crawlers supported on and maneuvered over a mine floor by means of the direct engagement of its track-laying treads with the floor. Often under such circumstances it may be desired to move the loading machine from one working place to another, and, under such conditions, the presence of mine trackways may complicate the movement of the machine by means of and upon its track-laying treads. Again, in tunnel driving it may be desired to employ a loading machine having crawlers or endless track-laying treads by which it is supported during the loading out of one or a series of rounds and yet have the machine capable of being moved back a substantial distance from the face or to another tunnel while wheel supported for movement over the mine track system.

From the foregoing, it may readily be understood that a primary object of my invention is to provide an improved vehicle having endless, orbitally movable, track-laying treads, but adapted, with a minimum of delay and of auxiliary mechanism, to be conditioned for movement over a mine trackway. Let it here be noted that there is no limitation of the utility of this invention, however, to use in mines, and that it is adapted to meet the problem for which it was designed wherever that problem is encountered. It is another object of the invention to provide improved devices associable with a vehicle having track-laying treads for preparing it for transport over a track system. It is a further object of the invention to provide an improved device adaptable to the treads of track-laying vehicles and movable by those treads into cooperative engagement with a track so that the vehicle may be readily moved, and at a relatively high speed if desired, over a track system. Other objects and advantages of the invention will hereinafter appear.

In the performance of the invention, in a preferred apparatus there may be provided supporting and fastening means for attachment to tread plates and to which small track wheels are suitably attached. Desirably, in one embodiment, individual wheels are mounted on axles which have associated with them clamps for engagement with the tread plates of endless track-laying devices, and, after clamping to the tread plates has been completed, the drives for the treads may be operated to cause the machine to climb up on the clamps and the track wheels and thus provide a wheeled support for the vehicle.

Depending upon the track gauge the wheels, where single wheels mutually independently mounted are used, may be located between the clamps, or the clamps may both be at one side of the wheel. Moreover, instead of using separate axles for each wheel, a full length cross axle can be used instead of stub axles and the track wheels be put on in pairs and the ends of the longer axle may be clamped to the crawler or track-laying treads on each side of the machine. This would make a stronger arrangement and would put less cantilever load on the crawler chain but would necessitate keeping the movement of the crawler chains equal on each side so as not to throw the shafts on a bias.

It will be understood that whatever the arrangement of the axles with respect to the wheels, it will be necessary after one wheel at each side of the machine, each at least substantially opposite the other, has been applied, to effect a limited circulation in their orbits of the crawler chains to bring the wheels under the treads, and then it will be desirable to bring a second wheel also under each of the treads. Of course, it would be possible, within the scope of the invention, however, to have two wheels on one tread spaced a substantial distance apart and a single wheel upon the other tread opposite a point intermediate the two wheels on the first tread, though it is preferable to confine the special crawler tread arrangements to those in which the bending load on the treads may be kept at a minimum.

After the machine is supported by wheels on the track rails, it may obviously be towed or pushed at a relatively high rate by a locomotive or the like to the desired new point of use, where the special wheel mountings can be removed and the machine restored to condition for normal operation with its treads directly engaging a subjacent surface over which it is to travel.

In the accompanying drawings in which three forms which the invention may assume in practice are shown for purposes of illustration:

Figure 1 is a side elevation of a loading machine having track-laying treads by which it is normally supported on and propelled over a mine floor, but supportable, as shown in this figure, on auxiliary track-engaging wheels;

Figure 2 is a fragmentary cross sectional view, with some parts shown in elevation, on the transverse vertical plane 2—2 of Figure 1, the scale being enlarged;

Figure 3 is a plan view, with associated parts shown in construction, of a wheel mounting according to Figure 2, a portion of only the bottom run of the endless tread being shown;

Figure 4 is a view, mainly in section, through a modified form of track wheel mountings; and Figure 5 is a view showing a modification in which a single axle has associated with it two wheels and clamping means for coaction with the opposite treads of a vehicle.

Referring now to the drawings, and first to Figure 1, there may be noted a vehicle 11, herein shown as a loading machine, having gathering mechanism 12 and a conveyor system 13 adapted to receive material from the gathering mechanism 12 and discharge it to a desired point of delivery.

The vehicle 11 is mounted on endless self-laying tracks or crawler devices 14, 14, arranged at opposite sides of the vehicle 11 and spaced apart a substantial distance. These may have their treads driven by any suitable mechanism and held against circulation in their orbits by suitable brake means, and since such drive and brake means are well known, they need not be illustrated herein, but it may be noted that appropriate reversible, plural-speed, driving and braking means for effecting reversible plural-speed drive of the crawler treads of a vehicle such as the vehicle 11, and for braking them individually, or both at the same time, is fully illustrated in the application of Carlton B. Frellsen, Serial No. 258,379, filed November 27, 1951, for Drive Controlling and Braking Devices Having Selective Automatic and Manual Brake Control, which application is assigned to my assignee, Joy Manufacturing Company. A motor 16 supplies power to the crawlers which include endless tread chains 17, 17 made up of suitably pivotally connected tread plates 18 pivotally connected together and driven and guided by engagement with sprockets 20 and having at their bases ground-engaging portions terminating in oppositely disposed flanges 21, 21 with which clamps later described are adapted to cooperate.

The vehicle 11 normally is supported on a subjacent surface on which it is adapted to work and move, but it may be desired to support it on track rails 25 for faster and more convenient movement; and the vehicle 11 is adapted to be supported on the rails 25 by wheels rotatably supported on axles which are secured in various ways, several of which are hereinafter described, to the tread plates 18.

In Figs. 1 through 3, suitable track-engaging wheels 27 are rotatably supported on axles, herein stub axles 28, through an intermediate bearing sleeve 29, and the axles have associated with them clamping means including a stationary jaw 30 and an oppositely facing and relatively movable clamping jaw 31 with which an adjusting device shown in the form of a screw 33 formed on the end of the stub axle 28 and a nut 34 cooperate. A washer 35 is desirably interposed between the nut and the adjacent surface of the clamping jaw 31. The axles 28 support the wheels 27 at points spaced from the portions thereof which are designed to underlie the endless tread chains 17, and the arrangement is such that it is especially adapted to meet a condition in which the track rails 25 are closer together than the treads—the gauge of the track is less than the gauge of the treads.

In applying the wheels to the endless tread devices, an axle 28 is secured by means of its clamp jaws 30, 31 to a tread plate 18 through engagement with the flanges 21 of the latter and moving of the movable clamp jaw 31 towards the stationary jaw. Desirably axles will be applied to the opposite crawlers at mutually opposite points and then the crawlers or endless treads will be driven until they bring the wheels beneath the bottom run of the crawlers and lift the whole vehicle 11 at one end. Then another pair of axles will be clamped to the crawlers in spaced relation to the first pair—in such spaced relation that both pairs of axle supported wheels may engage the rails 25 at the same time, and preferably be spaced by a distance equal to or less than the distance between the axes of rotation of the sprockets 20, 20. Again the crawlers will be operated until the second pair of wheels underlies the bottom run of the endless treads, and then the vehicle 11 will be supported solely by the wheels. Preferably the wheels may be applied when the vehicle is resting on the rails, but they may be applied when the vehicle is adjacent an end of the track and then have the vehicle rolled onto the track, or even in other positions.

Obviously, when the vehicle is supported on the track by the wheels it may be pushed or towed very conveniently and rapidly to a desired destination, and upon its arrival there, the wheels and axles can be removed and the vehicle again operated upon the mine floor or other subjacent surface over which it is to be operated.

It may occur in practice that the gauge of the vehicle treads may be substantially the same as the gauge of the trackway. Under such circumstances the wheels may need to be disposed directly beneath the endless treads. In such a situation the structure of Fig. 4 may desirably be used. Here it will be observed that a shorter section of axle 28' is employed. This is provided at one end with a head 35' to which a clamp jaw 30' is secured. Next to the head 35' the axle 28' supports the wheel upon a bearing sleeve 36. A spacer 37 follows, and then the adjustable jaw 31', with its adjusting means including the associated threaded axle end 33' and nut 34'. The mode of operation of this further arrangement needs no explanation, as it will be clear from the explanation given in connection with the first embodiment described.

At times, again, it may be found desirable to use a full length axle 28''. In such a case the axle will have wheels near each end, one wheel supported on a bearing sleeve 36'' arranged next to a stationary collar 38. Next to this wheel may come a relatively stationary clamp 30'', and then, after a suitable space, a relatively movable clamp 31'', and screw and nut tightening means 33'', 34''. At the other end there must be included some arrangement for permitting the clamp element 30''' to be adjusted enough to permit it to clear the flange 21 of the tread plate 18 it is to grip. One desirable arrangement for taking care of this is to secure the bushing or bearing sleeve 40 upon which the wheel is to turn, to the clamp 30''' and to fix a collar to the bushing at the other side of the wheel, to make the clamp 30''' slidable on the axle 28'', to bore the axle for a heavy rod 41 and slot the bored portion of the axle to provide elongated openings 42, 42, and extend a pin 43 through the clamp 30''', the openings 42, 42 and the rod 41, and to provide the outer end of the rod 41 with threads 44 and a nut 45, and desirably to place a washer 46 between the nut and the adjacent surface of the other clamp element 31'''. Obviously such an arrangement will permit the necessary movement of the clamp 30''' to bring the parts into proper relation with the tread plate to be clamped, and still locate the parts in proper assembled relation with the vehicle duly centered with respect to the track. After a first long axle 28'' is applied and brought under the endless treads, another will be applied and brought in its turn beneath the treads. No further explanation of this embodiment need be given.

In all of the embodiments described it will be evident that means is provided for the easy bringing of wheeled supports under a tractor mounted vehicle, that the parts are simple and rugged, easily assembled and disassembled, and that the power for the effecting of the location of the auxiliary transport devices beneath the vehicle is furnished by the latter.

While there are in this application specifically described three forms which the invention may assume in practice, it will be understood that these forms of the same are shown for purposes of illustration and that the invention may be further modified and embodied in various other forms without departing from its spirit or the scope of the appended claims.

What is claimed is:

1. In combination, a vehicle having endless track-laying treads and means for supporting said treads, causing them to circulate in elongated orbits and holding them against movement in their orbits, and means for supporting said vehicle for travel with said treads out of contact with the surface over which said vehicle is to be moved including wheels, means for rotatably supporting said wheels, and means for fastening said wheel supporting means to said treads for movement by the latter by travel in their orbits into positions in which the treads are lifted above the level of the bottoms of the wheels.

2. The combination recited in claim 1, in which said endless track-laying treads have a lower run and each tread has associated with it, during travel of the vehicle with the treads out of contact with the surface over which the vehicle is to be moved, a wheel having its means for rotatably supporting it fastened to the tread at a point near one end of the lower run of the latter and another wheel having the means for rotatably supporting it fastened to the tread at a point near the other end of the lower run of the latter.

3. The combination recited in claim 1 in which said fastening means includes clamp elements at each side of each wheel each engageable with a tread.

4. The combination recited in claim 1 in which said fastening means includes clamp elements both at the same side of the wheel with whose rotatable supporting means said clamp elements are associated and adapted to grip a tread between them.

5. The combination recited in claim 1 in which said means for rotatably supporting the wheels each support a pair of wheels respectively adapted to engage the opposite rails of a trackway.

6. In combination, a vehicle having endless track-laying treads and means for supporting said treads, causing them to circulate in elongated orbits and holding them against movement in their orbits, and means for supporting said vehicle for travel with said treads out of contact with the surface over which said vehicle is to be moved including wheels, means for rotatably supporting said wheels, and means for individually fastening said wheel supporting means to said treads for movement by the latter by travel in their orbits into positions in which the treads are lifted above the level of the bottoms of the wheels.

7. In combination, a vehicle having endless orbitally movable track-laying treads selectively driven by power or held against orbital movement, and adapted to provide support and transport for said vehicle or to hold it stationary, and means for supporting said vehicle, with said treads out of contact with a subjacent trackway over which it is desired to transport said vehicle including wheels adapted for engagement with and support by a trackway, axles supporting said wheels and clamp elements on said axles and engageable with said endless track-laying treads to clamp said axles to said treads for positioning by movement of the latter in their orbits into positions below said endless treads.

8. In combination, a vehicle having power circulated track-laying treads for its transport over an underlying surface, and devices for conditioning said vehicle for movement upon a trackway including wheels having tread surfaces adapted for rolling upon the rails of a trackway and mounting devices providing journals for said wheels and having means for attaching them to said track-laying treads, said mounting devices attachable to said track-laying treads at points on the latter above the portions of the latter which are in contact with a subjacent surface and movable by circulation of said track-laying treads to bring said wheels to positions in which the lower tread surfaces thereof are lower than the lowermost points in said track-laying treads.

9. A wheeled support-providing device for a vehicle having endless, orbitally movable track-laying treads comprising tread plates, said device including an axle element, a wheel rotatably supported thereon, and means for connecting said device to a tread for movement by the latter to position said wheel with its bottom beneath said orbit including clamp devices mounted on said axle element for engagement with a tread plate of an endless track-laying tread and means for effecting relative adjustment between the clamp devices on said axle element to cause them to clamp between them a tread plate.

10. A wheeled support-providing device as defined in claim 7, in which said clamp devices are formed to engage the opposite ends of a tread plate and in which the relative adjustment between said clamp devices is longitudinal of the axle element.

11. A wheeled support-providing device for a vehicle having endless, orbitally movable track-laying treads comprising tread plates, said wheeled support-providing device including an axle element, a wheel rotatably supported thereon, and means for connecting said device to a single tread plate for movement by the orbital movement of the latter to a position with the bottom of said wheel beneath the bottom of said tread plate including clamp devices arranged for concurrent engagement with a single tread plate of one endless track-laying tread mounted on said axle element both at one side of said wheel and relatively adjustable to clamp such single tread plate.

12. A wheeled support-providing device for a vehicle having endless, orbitally movable track-laying treads comprising tread plates, said wheeled support-providing device including an axle element, a wheel rotatably supported thereon, and means for connecting said device to a single tread plate for movement by the latter to a position with the bottom of said wheel beneath the bottom of said tread plate including clamp devices for engagement with the tread plate of one endless track-laying tread mounted on said axle element at opposite sides of said wheel and relatively adjustable to clamp such tread plate between them.

13. In combination, a vehicle having endless track-laying treads and means for supporting and causing them to circulate in elongated orbits, and means, including wheels having means for rotatably supporting them and means for clamping said last mentioned means to said treads, for supporting said vehicle upon the rails of a trackway with said treads above the level of the top of the trackway, said means for so supporting said vehicle movable upon circulation of said treads from positions above the bottom of said treads to a position below the bottom thereof.

14. The combination of claim 13 in which said means for rotatably supporting said wheels each comprise an axle supporting a single wheel and in which said clamping means includes clamp elements one fixed to said axle and the other movable longitudinally thereof.

15. The combination of claim 14 in which said clamp elements are both at the same side of the wheel.

16. The combination of claim 14 in which said clamp elements are spaced apart by said wheel.

17. The combination of claim 13 in which said means for rotatably supporting said wheels comprise axles each supporting a pair of wheels and separate clamping means are arranged one at each end of said axle.

18. The combination of claim 13 in which said means for rotatably supporting said wheels comprise axles each supporting a pair of wheels and separate clamping means are arranged one at each side of the longitudinal center of the axle.

References Cited in the file of this patent
UNITED STATES PATENTS

| | | |
|---|---|---|
| 1,747,196 | Vodoz | Feb. 18, 1930 |
| 1,937,556 | Field | Dec. 5, 1933 |
| 1,959,599 | Sann | May 22, 1934 |
| 2,344,764 | Younie | Mar. 21, 1944 |
| 2,491,034 | Couch | Dec. 13, 1949 |